United States Patent
Goslin (10) Patent No.: US 9,922,465 B2
(45) Date of Patent: Mar. 20, 2018

(54) SYSTEMS AND METHODS FOR CHANGING A PERCEIVED SPEED OF MOTION ASSOCIATED WITH A USER

(71) Applicant: DISNEY ENTERPRISES, INC., Burbank, CA (US)

(72) Inventor: Michael Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 9 days.

(21) Appl. No.: 15/157,347

(22) Filed: May 17, 2016

(65) Prior Publication Data
US 2017/0337735 A1     Nov. 23, 2017

(51) Int. Cl.
| | |
|---|---|
| *G06F 3/00* | (2006.01) |
| *G06F 3/01* | (2006.01) |
| *G06T 19/00* | (2011.01) |
| *G06T 19/20* | (2011.01) |
| *G02B 27/00* | (2006.01) |
| *G02B 27/01* | (2006.01) |

(52) U.S. Cl.
CPC .......... *G06T 19/006* (2013.01); *G06F 3/005* (2013.01); *G06F 3/011* (2013.01); *G06T 19/20* (2013.01); *G02B 27/0093* (2013.01); *G02B 27/017* (2013.01); *G09G 2340/10* (2013.01); *G09G 2340/12* (2013.01); *G09G 2340/125* (2013.01); *G09G 2340/14* (2013.01); *G09G 2340/145* (2013.01)

(58) Field of Classification Search
CPC ...... G06T 19/006; G06F 3/011; G06F 3/0346; G06F 3/04815; G02B 27/0093; G02B 27/017; G09G 2340/10; G09G 2340/12; G09G 2340/125; G09G 2340/14; G09G 2340/145; G09G 2354/00; G09G 3/003
USPC ....................................................... 345/633
See application file for complete search history.

(56) References Cited

U.S. PATENT DOCUMENTS

| | | |
|---|---|---|
| 6,179,619 B1 | 1/2001 | Tanaka |
| 8,585,476 B2 | 11/2013 | Mullen |
| 8,817,047 B1 | 8/2014 | Lee |

(Continued)

OTHER PUBLICATIONS

Virtual Reality & Interaction URL: http://graphics.cs.cmu.edu/nsp/course/15-462/Spring04/slides/23_vr.pdf, Dec. 31, 2013, 21 pages.

*Primary Examiner* — Jin-Cheng Wang
(74) *Attorney, Agent, or Firm* — Sheppard Mullin Richter & Hampton LLP (57) ABSTRACT

A perceived speed of motion associated with a user may be changed by determining a speed and a direction of the motion associated with the user within a reference frame. Augmented reality content may be determined for presentation on a display. A direction and a speed of motion associated with the augmented reality content within the reference frame may be determined. The direction of motion associated with the augmented reality content may oppose the direction of motion associated with the user. The speed of motion associated with the augmented reality content may increase as the speed of motion associated with the user increases. The augmented reality content may be presented such that the augmented reality content appears to move toward and past a position associated with the user at the perceived speed that is faster than the speed of motion associated with the user.

16 Claims, 8 Drawing Sheets

(56) References Cited

U.S. PATENT DOCUMENTS

| | | |
|---|---|---|
| 8,944,928 B2 | 2/2015 | Kaps |
| 9,135,753 B2 | 9/2015 | Raghoebardayal |
| 2010/0178966 A1 | 7/2010 | Seydoux |
| 2012/0142415 A1 | 6/2012 | Lindsay |
| 2013/0265333 A1 | 10/2013 | Ainsworth |
| 2014/0240351 A1* | 8/2014 | Scavezze ................ G06F 3/011 345/633 |
| 2015/0062163 A1* | 3/2015 | Lee ........................ G09G 3/003 345/633 |
| 2015/0123965 A1 | 5/2015 | Molyneaux |
| 2015/0346722 A1 | 12/2015 | Herz |

\* cited by examiner

SYSTEMS AND METHODS FOR CHANGING A PERCEIVED SPEED OF MOTION ASSOCIATED WITH A USER

FIELD

This disclosure relates to systems and methods configured to facilitate changing a perceived speed of motion associated with a user.

BACKGROUND

Augmented reality systems may provide a realistic view of the world with overlaid information to a user. A flight simulator may provide simulated experience of flying in an airplane. A flight simulator may use movement of virtual objects to simulate motion. For example, movement of virtual missiles may simulate motion of a user within a flight simulator.

SUMMARY

This disclosure relates to changing a perceived speed of motion associated with a user. A user may be viewing augmented reality content in conjunction with real world surroundings which are visible on or through a display. The user's perception of the speed of the motion associated with the user may be changed by setting a speed and/or a direction of motion associated with at least some of the augmented reality content based on the speed and/or the direction of the motion associated with the user within a reference frame. Augmented reality content may be movable within the reference frame. A direction and/or a speed of motion associated with the augmented reality content within the reference frame may be determined. In some implementations, the direction of the motion associated with the augmented reality content may be configured to oppose the direction of the motion associated with the user. In some implementations, the speed of the motion associated with the augmented reality content may be configured to increase as the speed of the motion associated with the user increases. Presentation of the augmented reality content may be effectuated such that the augmented reality content may appear to move toward and past a position associated with the user. The augmented reality content may appear to move at a speed that may be faster than the speed of the motion associated with the user, thereby changing the user's perception of motion.

In some implementations, a system configured to change a perceived speed of motion associated with a user may include one or more of a display, a sensor, one or more physical processors, and/or other components. The display may include one or more devices that may present information visually. The display may be configured to present augmented reality content and/or other information. The augmented reality content and/or other information may be presented in conjunction with real world surroundings which may be visible on and/or through the display. The augmented reality content and/or other information may be presented within a reference frame that may be fixed with respect to the real world surroundings.

In some implementations, the display may include one or more screens of one or more display devices. In some implementations, the display may include one or more display devices. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The sensor may be configured to generate output signals conveying motion associated with the user and/or other information. In some implementations, the sensor may include one or more of an inertial measurement unit, an accelerometer, a gyroscope, a magnetometer, a magnetic position sensor, a radio-frequency position sensor, a distance sensor, and/or other motion and orientation sensors.

The output signals may convey motion associated with a user within a reference frame. Information conveyed by the output signals may characterize one or more of a speed of the motion associated with the user, a direction of the motion associated with the user, and/or other information. In some implementations, motion associated with a user may include motion of the user. In some implementations, motion associated with a user may include motion of a physical object controlled by the user.

One or more physical processors may be configured by machine-readable instructions. Executing machine-readable instructions may cause the one or more physical processors to facilitate changing a perceived speed of motion associated with a user. Machine-readable instructions may include one or more computer program components. The computer program components may include one or more of a motion component, an augmented reality content component, an augmented reality direction component, an augmented reality speed component, a presentation component, and/or other computer program components.

The motion component may be configured to determine motion associated with a user within a reference frame. Motion associated with the user may correspond to one or more of a speed of motion associated with the user, a direction of motion associated with the user, and/or other information. A speed and/or a direction of motion associated with the user may be determined based on the output signals and/or other information.

The augmented reality content component may be configured to determine augmented reality content for presentation on the display. The augmented reality content component may be configured to select first augmented reality content and/or other augmented reality content for presentation on the display. The first augmented reality content may be moveable within a reference frame. In some implementations, the augmented reality content component may be configured to select second augmented reality content and/or other augmented reality content. The second augmented reality content may be fixed within a reference frame at an augmented reality content position.

In some implementations, the augmented reality content component may be configured to determine one or more effects associated with the augmented reality content. The one or more effects may include a speed line effect and/or other effects. A speed line effect may be determined in response to one or more of a speed of motion associated with a user within a reference frame meeting and/or exceeding a threshold speed and/or based on other factors.

The augmented reality direction component may be configured to determine one or more directions of motion associated with the first augmented reality content and/or other augmented reality content within a reference frame. Direction(s) of motion associated with the first augmented reality content within a reference frame may be determined based on the direction(s) of motion associated with a user within the reference frame. The direction(s) of motion associated with the first augmented reality content may be configured to oppose the direction(s) of the motion associated with the user, and/or may be configured in other ways.

The augmented reality speed component may be configured to determine one or more speed(s) of motion associated with the first augmented reality content and/or other augmented reality content within a reference frame. The speed(s) of motion associated with the first augmented reality content within the reference frame may increase as the speed(s) of the motion associated with the user within the reference frame increases. This relative increase may cause the user's perceived speed(s) of the motion associated with the user to be faster than the speed(s) of the motion associated with the user within the reference frame.

In some implementations, a relationship between a speed of motion associated with a user and a speed of motion associated with the first augmented reality content may include a linear relationship, and/or other relationships. In some implementations, a relationship between a speed of motion associated with a user and a speed of motion associated with the first augmented reality content may include a non-linear relationship, and/or other relationships. In some implementations, a relationship between a speed of motion associated with a user and a speed of motion associated with a first augmented reality content may include a threshold speed, and/or other relationships.

The presentation component may be configured to effectuate presentation of the augmented reality content and/or other information on the display. Presentation of the augmented reality content on the display may be effectuated such that the first augmented reality content may appear to move toward and/or past a position associated with the user at the perceived speed that may be faster than the speed of motion associated with the user. In some implementations, presentation of the augmented reality content on the display may be further effectuated such that the second augmented reality content may appear to be fixed at the augmented reality content position.

In some implementations, the presentation component may be configured to determine a field of view associated with a user. Effectuating presentation of the augmented reality content on the display may be further based on the field of view associated with the user. In some implementations, the field of view associated with the user may include a field of view of one or more image sensors.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
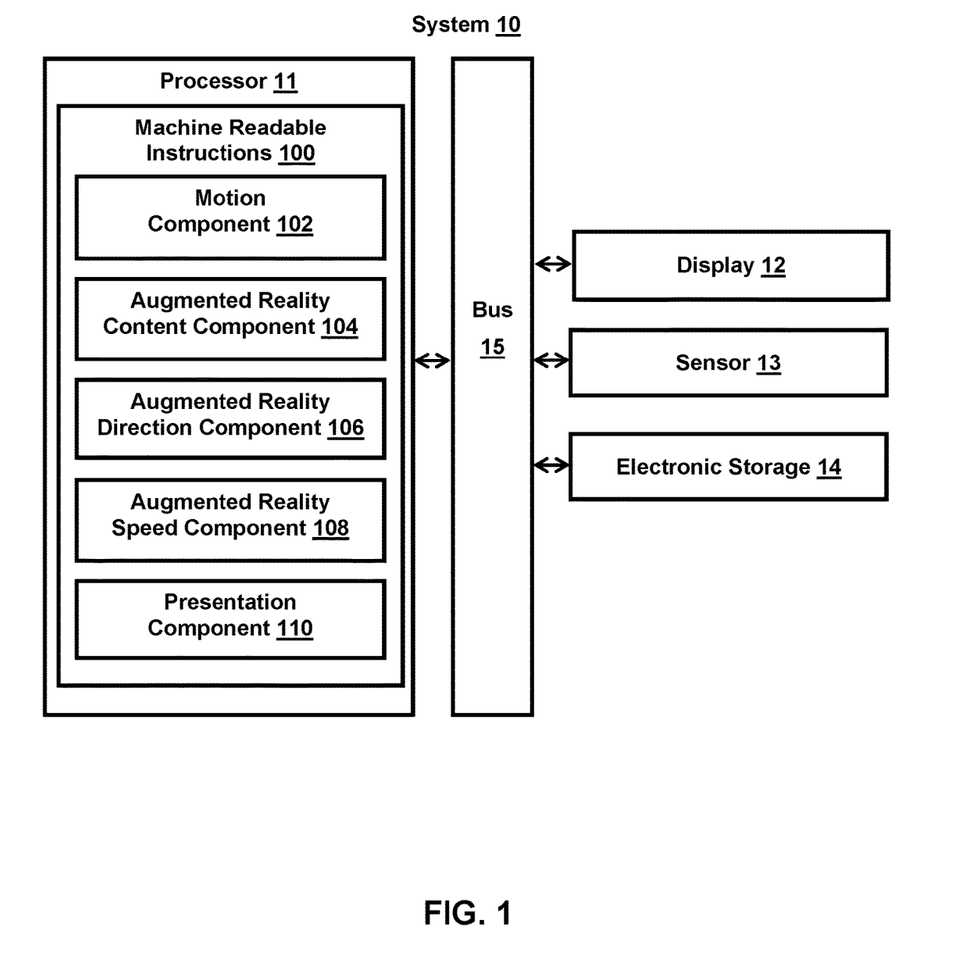
FIG. 1 illustrates a system for changing a perceived speed of motion associated with a user.

FIG. 1 illustrates system 10 for changing a perceived speed of motion associated with a user. System 10 may include one or more of processor 11, display 12, sensor 13, electronic storage 14, bus 15, and/or other components. A user may be viewing augmented reality content in conjunction with real world surroundings which are visible on or through display 12. The user's perception of the speed of the motion associated with the user may be changed by setting a speed and/or a direction of motion associated with at least some of the augmented reality content based on the speed and/or the direction of the motion associated with the user within a reference frame. Augmented reality content may be determined for presentation on display 12. The augmented reality content may be movable within the reference frame. A direction and/or a speed of motion associated with the augmented reality content within the reference frame may be determined. The direction of the motion associated with the augmented reality content may be configured to oppose the direction of the motion associated with the user. The speed of the motion associated with the augmented reality content may be configured to increase as the speed of the motion associated with the user increases. Presentation of the augmented reality content may be effectuated such that the augmented reality content may appear to move toward and past a position associated with the user. The augmented reality content may appear to move at a speed that may be faster than the speed of the motion associated with the user, thereby changing the user's perception of motion.

Display 12 may be configured to present augmented reality content and/or other information. Display 12 may include one or more devices that may present information visually. The augmented reality content and/or other information may be presented in conjunction with real world surroundings which may be visible on and/or through display 12. In some implementations, real world surroundings may be captured by image sensor(s) and presented on display 12. Display 12 may present augmented reality content overlaid over the real world surroundings captured by image sensor(s). In some implementations, display 12 may allow light to be passed through display 12 in portions not containing augmented reality content. Display 12 may allow a user to see light from the real world as well as augmented reality content. In some implementations, the transparency of one or more portions of display 12 may be changed. For example, the transparency of one or more portions of display 12 corresponding to one or more portions of augmented reality content may be changed to block light from the real world passing through display 12.

In some implementations, display 12 may include one or more screens of one or more display devices. In some implementations, display 12 may include one or more display devices. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and/or other components of system 10 may be carried on display 12. In some implementations, one or more image sensors may be carried on display 12. The field of view of image sensor(s) may be a function of the position and/or the orientation of display 12, and/or other information.

The augmented reality content and/or other information may be presented within a reference frame that may be fixed with respect to the real world surroundings. Augmented reality content may refer to one or more information that may be observed visually. Augmented reality content may be static or dynamic, and may be visually observable at a time, over a period of time, at a location, or over a range of locations. As a non-limiting example, augmented reality content may include one or more of an image, a video, and/or other visual effects.

Figure 3:
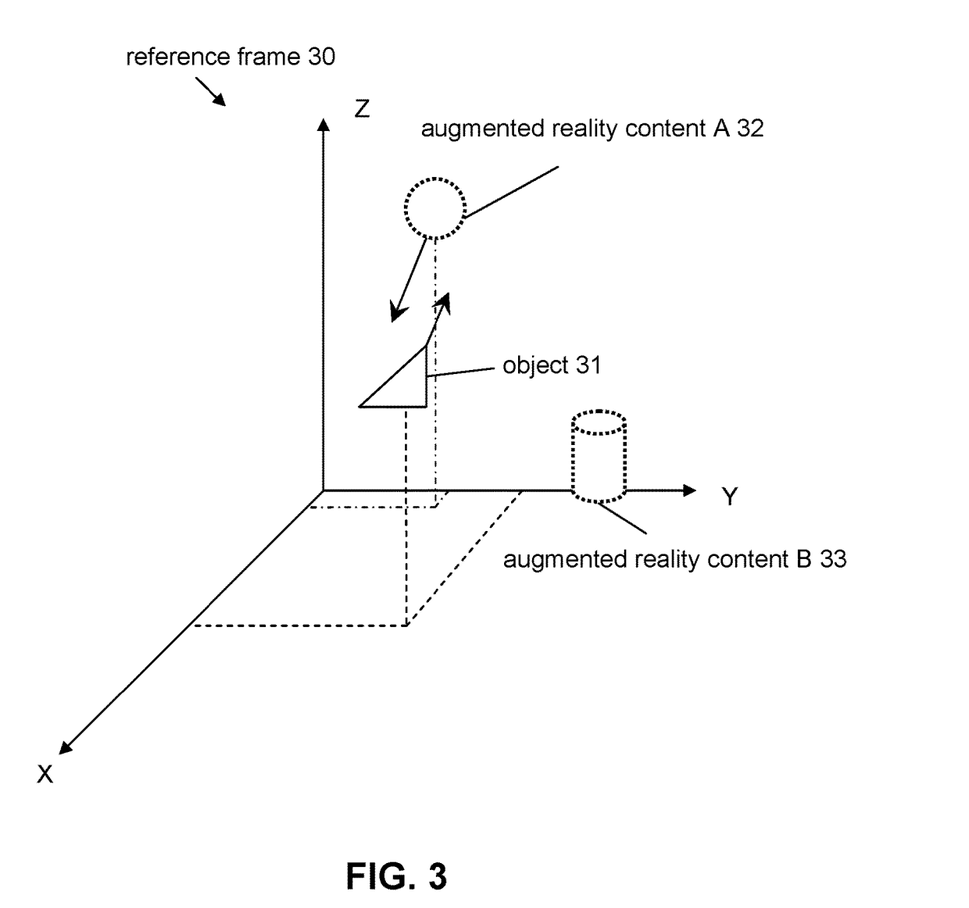
FIG. 3 illustrates an example of a reference frame.

A reference frame may refer to a framework that allows for observation and/or description of motion. A reference frame may include a coordinate system and reference points that fix the coordinate system. For example, FIG. 3 illustrates an example of reference frame 30. Reference frame 30 may include an X-Y-Z coordinate system. The X-Y-Z coordinate system may be fixed with respect to the real world surroundings. For example, one or more points on the X-axis and one or more points on Y-axis may be fixed to a ground of the real world surroundings. X-Y plane of reference frame 30 may be fixed to a level surface of the real world surroundings. Other reference frames and other fixations of reference frames are contemplated.

A reference frame may allow for determination of motion associated with a user and/or motion associated with augmented reality content. For example, frame 30 may be used to determine motion of object 31, augmented reality content A 32, augmented reality content B 33, and/or other objects/augmented reality contents. Object 31 may be associated with a user. Object 31 may include a user and/or a physical object controlled by a user. Object 31 may be located further down the X-axis and further down the Y-axis than augmented reality content A 32. Object 31 may be located below augmented reality content A 32 in the Z-axis. Augmented reality content B 33 may be located on Y-axis. Object 31 and augmented reality content A 32 may be moving within reference frame 30. Object 31 may be moving in a direction indicated by arrow coming out of object 31. Augmented reality content A 32 may be moving in a direction indicated by arrow coming out of augmented reality content A 32. Direction of motion of augmented reality content A 32 may be opposite of direction of motion of object 31. Speed of motion of augmented reality content A 32 may be faster than speed of motion of object 31. Augmented reality content B 33 may be stationary within reference frame 30.

Sensor 13 may be configured to generate output signals. Sensor 13 may be carried (e.g., attached to, supported, held, and/or otherwise carried) by a user or a physical object controlled by the user. A physical object may be locally controlled by the user or remotely controlled by the user. For example, a physical object may include one or more of a vehicle, a remote controlled vehicle, an autonomous vehicle, and/or other physical objects. In some implementations, a physical object may include one or more of remoted controlled vehicles described in U.S. patent application Ser. No. 15/018,764, entitled "SYSTEM AND METHOD OF SIMULATING FIRST-PERSON CONTROL OF REMOTE-CONTROLLED VEHICLES," filed on Feb. 8, 2016, the foregoing being incorporated herein by reference in its entirety. In some implementations, sensor 13 may include one or more of an inertial measurement unit, an accelerometer, a speed sensor, a gyroscope, a magnetometer, a magnetic position sensor, a radio-frequency position sensor, a global positioning system, a distance sensor, a tilt sensor, an inclination sensor, an angular rate sensor, and/or other motion and orientation sensors.

The output signals may convey the motion associated with the user within the reference frame, and/or other information. Information conveyed by the output signals may characterize one or more of a speed of the motion associated with the user, a direction of the motion associated with the user, and/or other information. In some implementations, the motion associated with the user may include motion of the user. Motion of the user may include one or more of positions of the user, changes in positions of the user, linear speeds of the user, linear accelerations of the user, orientations (yaw, pitch, and/or roll) of the user, changes in orientations of the user, angular speeds of the user, angular accelerations of the user, and/or other motions of the user at a time or over a period of time.

In some implementations, the motion associated with a user may include motion of a physical object controlled by the user. Motion of the physical object controlled by the user may include one or more of positions of the physical object controlled by the user, changes in positions of the physical object controlled by the user, linear speeds of the physical object controlled by the user, linear accelerations of the physical object controlled by the user, orientations (yaw, pitch, and/or roll) of the physical object controlled by the user, changes in orientations of the physical object controlled by the user, angular speeds of the physical object controlled by the user, angular accelerations of the physical object controlled by the user, and/or other motions of the physical object controlled by the user at a time or over a period of time.

Electronic storage 14 may include electronic storage medium that electronically stores information. Electronic storage 14 may store software algorithms, information determined by processor 11, information received remotely, and/or other information that enables system 10 to function properly. For example, electronic storage 14 may store information relating to a user, a physical object controlled by a user, motion associated with a user, speed of motion associated with a user, direction of motion associated with a user, augmented reality content, speed of motion associated with augmented reality content, direction of motion associated with augmented reality content, reference frame, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate changing a perceived speed of motion associated with a user. Machine-readable instructions 100 may include one or more computer program components. Machine readable instructions 100 may include one or more of motion component 102, augmented reality content component 104, augmented reality direction component 106, augmented reality speed component 108, presentation component 110, and/or other computer program components.

Motion component 102 may be configured to determine motion associated with the user within the reference frame. Motion associated with the user may correspond to one or more of a speed of motion associated with the user, a direction of motion associated with the user, and/or other information. The speed(s) and the direction(s) of the motion associated with the user may be determined based on the output signals, and/or other information. For example, motion component 102 may determine a speed and a direction of motion of object 31 within reference frame 30 (shown in FIG. 3) based on the output signals generated by sensor 13.

Augmented reality content component 104 may be configured to determine augmented reality content for presentation on display 12. Augmented reality content component 104 may be configured to select first augmented reality content and/or other augmented reality content for presentation on display 12. Augmented reality content component 104 may select first augmented reality content and/or other augmented reality content based on user input, a landmark (e.g., an augmented reality marker, etc.), active motion of object 31 (e.g., changes in position, location, and/or direction of object 31), and/or other information. The first augmented reality content may be moveable within the reference frame. The first augmented reality content may be selected from one or more classes of mobile augmented reality content. Mobile augmented reality content may refer to augmented reality content that may move within a reference frame based on motion associated with a user to change a perceived speed of the motion associated with the user. Mobile augmented reality content may be selected before, in response to, or after active motion associated with a user or a certain level of active motion associated with a user. As a non-limiting example, mobile augmented reality content may include one or more of a particle effect, dust, rain, snow, hail, cloud, smoke, and/or other mobile augmented reality content. For example, augmented reality content A 32 (shown in FIG. 3) may be a mobile augmented reality content (e.g., a cloud, etc.). Augmented reality content A 32 may move within reference frame 30 based on motion of object 31 to change a perceived speed of the motion of object 31.

In some implementations, augmented reality content component 104 may be configured to select second augmented reality content and/or other augmented reality content. Augmented reality content component 104 may select second augmented reality content and/or other augmented reality content based on user input, a landmark (e.g., an augmented reality marker, etc.), motion of object 31 (e.g., position, location, and/or direction of object 31), and/or other information. The second augmented reality content may be fixed within the reference frame at an augmented reality content position. The second augmented reality content may be selected from one or more classes of stationary augmented reality content. Stationary augmented reality content may refer to augmented reality content that may be fixed within a reference frame regardless of motion associated with a user. Stationary augmented reality content may augmented the appearance of real world surroundings at a time, over a period of time, at a location, or over a range of locations. As a non-limiting example, stationary augmented reality content may include one or more of a structure, a landscape, and/or other stationary augmented reality content. For example, augmented reality content B 33 (shown in FIG. 3) may be a stationary augmented reality content (e.g., a building, etc.). Augmented reality content B 33 may be fixed within reference frame 30 regardless of motion of object 31.

In some implementations, augmented reality content component 104 may be configured to determine one or more effects associated with the augmented reality content. One or more effects associated with the augmented reality content may include a speed line effect and/or other effects. A speed line effect may refer to a visual effect that simulates a fast speed of motion associated with a user. A speed line effect may replace the first augmented reality content or stretch/blur the first augmented reality content. A speed line effect may be determined in response to one or more of a speed of the motion associated with the user within the reference frame meeting and/or exceeding a threshold speed, and/or based on other factors. For example, the first augmented reality content may include a cloud and a speed line effect (e.g., replacing cloud with a stretched/blurred cloud or stretching/blurring the cloud, etc.) may be determined in response to the speed of object 31 meeting and/or exceeding a threshold speed.

In some implementations, augmented reality content component 104 may be configured to determine other augmented reality content. Other augmented reality content may include one or more virtual objects that augments the appearance of object 31. As a non-limiting example, one or more parts of object 31 may be augmented with one or more parts of a virtual vehicle, a virtual robot, a virtual suit, a virtual person, a virtual creature, and/or other virtual objects.

Augmented reality direction component 106 may be configured to determine one or more direction(s) of motion associated with the first augmented reality content and/or other augmented reality content within the reference frame. The direction(s) of motion associated with the first augmented reality content within the reference frame may be determined based on the direction(s) of the motion associated with the user within the reference frame. The direction(s) of the motion associated with the first augmented reality content may be configured to oppose the direction(s) of the motion associated with the user, and/or may be configured in other ways. The opposing direction(s) may cause the first augmented reality content to move toward and/or past a position associated with the user in the reference frame. For example, augmented reality direction component 106 may determine a direction of motion of augmented reality content A 32 based on a direction of motion of object 31. The direction of motion of augmented reality content A 32 may oppose the direction of motion of object 31. The direction of motion of augmented reality content A 32 may cause augmented reality content A 32 to move toward and/or past a position of object 31.

Augmented reality speed component 108 may be configured to determine one or more speeds of the motion associated with the first augmented reality content and/or other augmented reality content within the reference frame. The speed(s) of the motion associated with the first augmented reality content within the reference frame may increase as the speed(s) of the motion associated with the user within the reference frame increases. This relative increase may cause the user's perceived speed(s) of the motion associated with the user to be faster than the speed(s) of the motion associated with the user within the reference frame. For example, augmented reality speed component 108 may determine a speed of motion of augmented reality content A 32 based on a speed of motion of object 31. The speed of motion of augmented reality content A 32 may generally increase as the speed(s) of the motion of object 31 increases. Augmented reality speed component 108 may include and/or retrieve information (e.g., a database, etc.) that matches a speed of motion associated with a user with a speed of motion associated with the first augmented reality content.

Figure 4A:
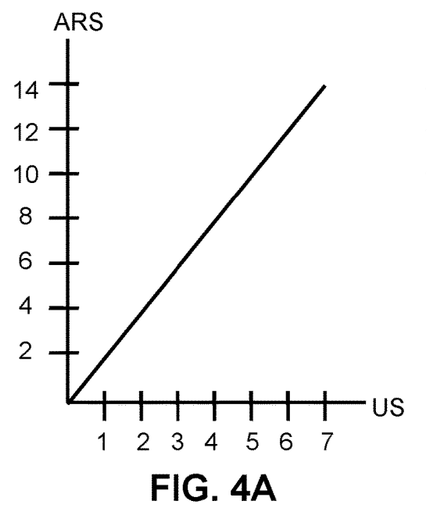
FIGS. 4A-4D illustrate examples of relationships between speed of motion associated with a user and speed of motion associated with augmented reality content.
Figure 4B:
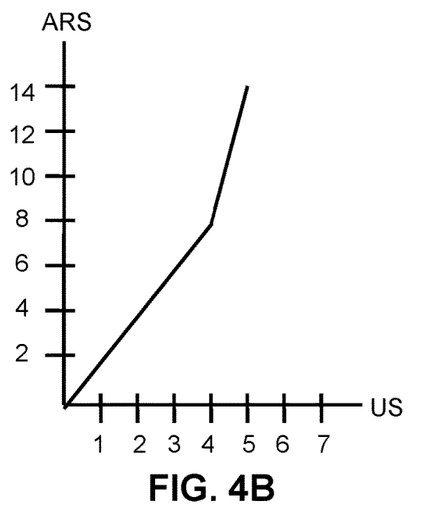
Figure 4C:
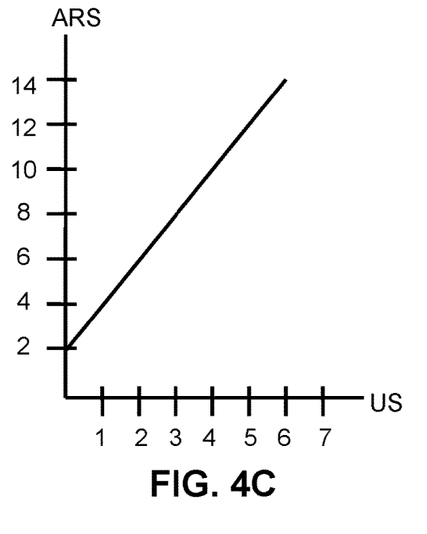

In some implementations, a relationship between a speed of the motion associated with the user and a speed of the motion associated with the first augmented reality content may include one or more linear relationships, and/or other relationships. FIGS. 4A-4C illustrate examples of relationships between speed of motion associated with a user and speed of motion associated with first augmented reality content. Speed of motion associated with a user may be indicated as US (user speed) and speed of motion associated with first augmented reality content may be indicated as ARS (augmented reality content speed).

In FIG. 4A, speed of motion associated with the first augmented reality content may double speed of motion associated with a user. For example, when a value of a speed of motion associated with a user is 4 (e.g., 4 m/s), a value of a speed of motion associated with the first augmented reality content may be 8 (e.g., 8 m/s). In FIG. 4B, speed of motion associated with the first augmented reality content may double speed of motion associated with a user when a value of a speed of motion associated with a user is between 0 and 4. Speed of motion associated with the first augmented reality content may quadruple speed of motion associated with a user when a value of a speed of motion associated with a user is over 4. In FIG. 4C, speed of motion associated with the first augmented reality content may double speed of motion associated with a user and include a speed offset of 2. For example, when a value of a speed of motion associated with a user is 4, a value of a speed of motion associated with the first augmented reality content may be 10. Other linear relationships between a speed of the motion associated with the user and a speed of the motion associated with the first augmented reality content are contemplated.

Figure 5A:
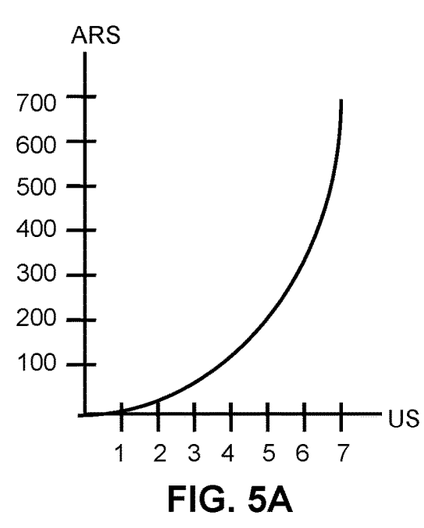
FIGS. 5A-5D illustrate examples of relationships between speed of motion associated with a user and speed of motion associated with augmented reality content.
Figure 5B:
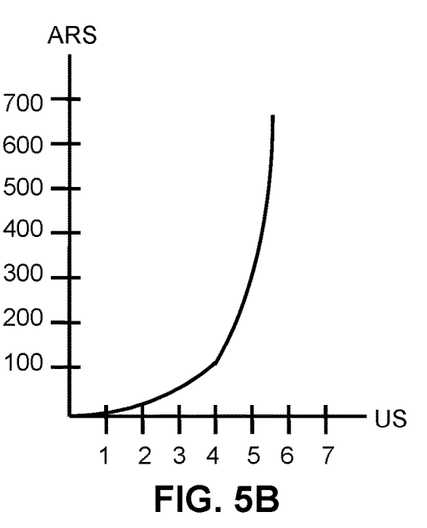
Figure 5C:
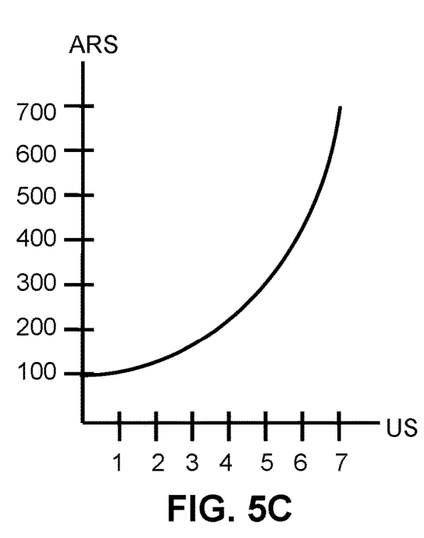

In some implementations, a relationship between a speed of the motion associated with the user and a speed of the motion associated with the first augmented reality content may include one or more non-linear relationships, and/or other relationships. FIGS. 5A-5C illustrate examples of relationships between speed of motion associated with a user and speed of motion associated with the first augmented reality content.

In FIG. 5A, speed of motion associated with the first augmented reality content may increase exponentially as speed of motion associated with a user increases. In FIG. 5B, speed of motion associated with the first augmented reality content may increase exponentially at one rate when a value of a speed of motion associated with a user is between 0 and 4, and may increase exponentially at another rate (e.g., a faster rate) when a value of a speed of motion associated with a user is over 4. In FIG. 5C, speed of motion associated with the first augmented reality content may increase exponentially as speed of motion associated with a user increases and include a speed offset of 100. Other non-linear relationships between a speed of the motion associated with the user and a speed of the motion associated with the first augmented reality content are contemplated.

In some implementations, a relationship between a speed of the motion associated with the user and a speed of the motion associated with the first augmented reality content may include one or more linear relationship, one or more non-linear relationships, and/or other relationships. Other relationships between a speed of the motion associated with the user and a speed of the motion associated with the first augmented reality content are contemplated.

Figure 4D:
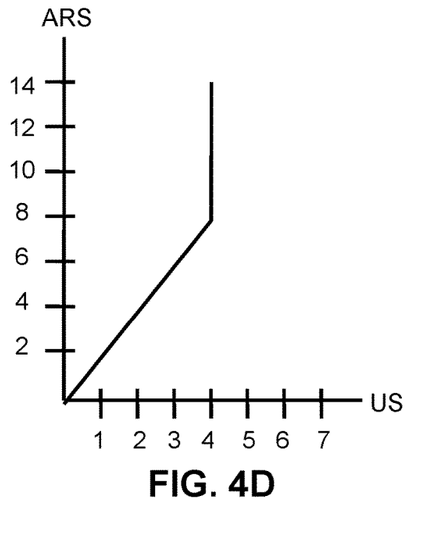
Figure 5D:
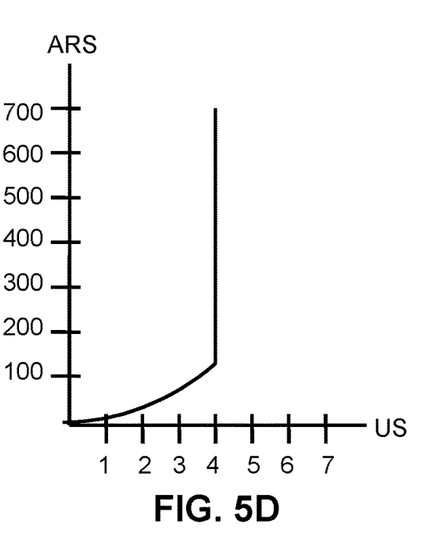

In some implementations, a relationship between a speed of the motion associated with the user a the speed of the motion associated with the first augmented reality content may include a threshold speed, and/or other relationships. FIGS. 4D and 5D illustrates examples of relationships between speed of motion associated with a user and speed of motion associated with first augmented reality content. In FIG. 4D, speed of motion associated with the first augmented reality content may double speed of motion associated with a user when a value of a speed of motion associated with a user is between 0 and 4. Speed of motion associated with the first augmented reality content may change in character (e.g., shown through one or more speed line effects) when a value of a speed of motion associated with a user is over 4 (threshold speed). In FIG. 5D, speed of motion associated with the first augmented reality content may increase exponentially when a value of a speed of motion associated with a user is between 0 and 4. Speed of motion associated with the first augmented reality content may change in character (e.g., shown through one or more speed line effects) when a value of a speed of motion associated with a user is over 4 (threshold speed). In response to a speed of motion associated with a user meeting and/or exceeding a threshold speed, augmented reality content component 104 may determine one or more speed line effects.

Presentation component 110 may be configured to effectuate presentation of augmented reality content and/or other information on display 12. In some implementations, presentation component 110 may be configured to effectuate presentation of augmented reality content and/or other information within one or more of an image, a video, and/or other visual information. In some implementations, presentation component 23 may be configured to effectuate presentation of augmented reality content on display 12, which allows light to be passed through display 12 in portions not containing augmented reality content. For example, display 12 may include one or more of an optical head-mounted display and a user of display 12 may see light from the real world as well as the augmented reality content. In some implementations, presentation component 110 may be configured to change the transparency of one or more portions of display 12. For example, the transparency of one or more portions of display 12 corresponding to one or more portions of augmented reality content may be changed to block light from the real world passing through display 12.

Figure 6A:
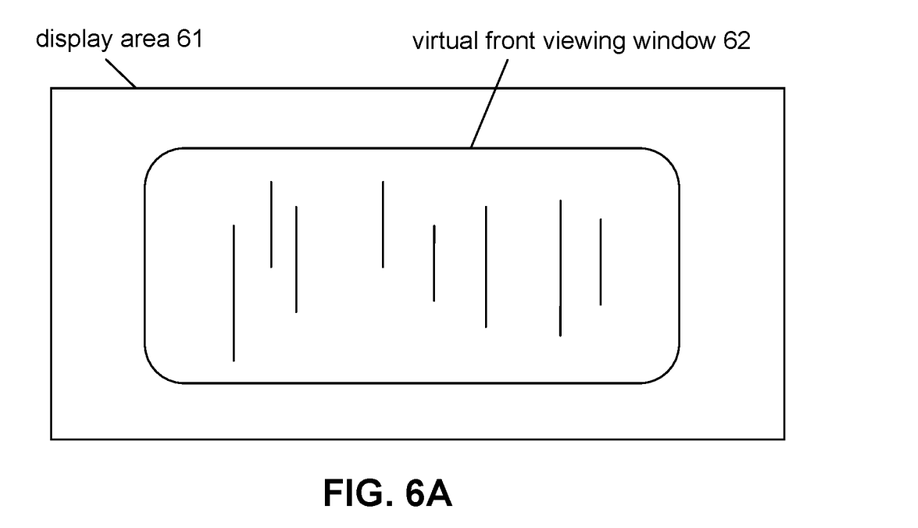
FIGS. 6A-6B illustrate examples of virtual front viewing window shown in a display area of a display.
Figure 6B:
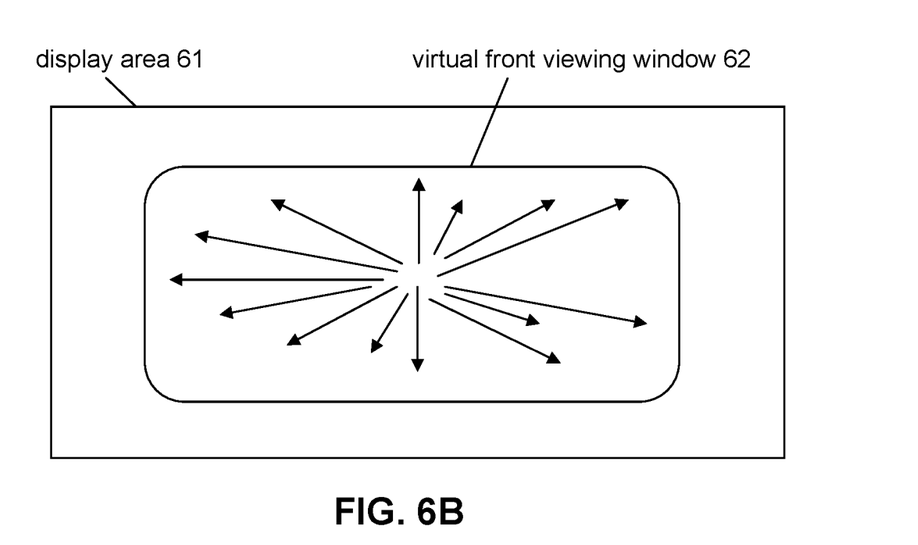

Presentation of augmented reality content on display 12 may be effectuated such that the first augmented reality content may appear to move toward and/or past a position associated with the user at a perceived speed that may be faster than the speed of the motion associated with the user. For example, FIGS. 6A-6B illustrate examples of virtual front viewing window 62 shown in display area 61 of display 12. In FIG. 6A, a speed of motion associated with a user may be zero (a user/a physical object controlled by a user may not be moving). In FIG. 6A, augmented reality content may include virtual rain shown in virtual front viewing window 62. In FIG. 6B, a speed of motion associated with a user may be greater than zero (a user/a physical object controlled by a user may be moving). In FIG. 6B, virtual rain may appear to move toward and past a position associated with the user at a perceived speed faster than the speed of the motion associated with the user.

Figure 7A:
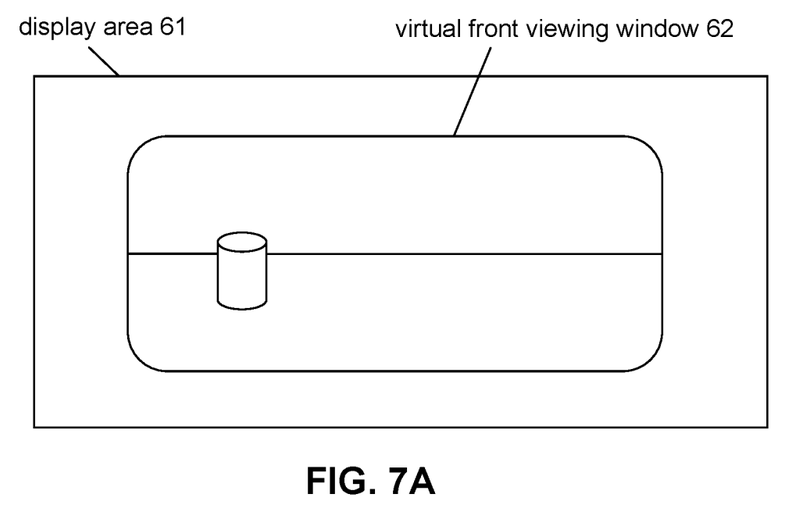
FIGS. 7A-7B illustrate examples of virtual front viewing window shown in a display area of a display.
Figure 7B:
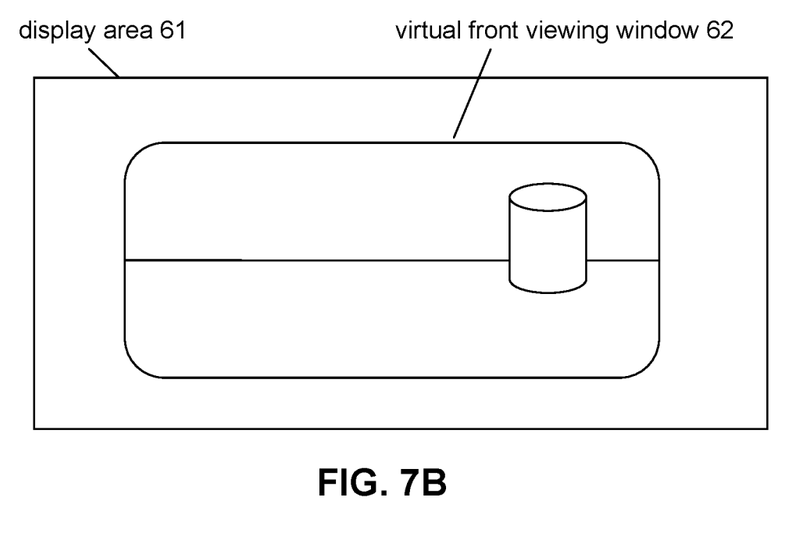

In some implementations, presentation of the augmented reality content on display 12 may be further effectuated such that the second augmented reality content appears to be fixed at the augmented reality content position. For example, FIGS. 7A-7B illustrate examples of virtual front viewing window 62 shown in display area 61 of display 12. In FIG. 7A, augmented reality content may include a virtual structure shown in left side of virtual front viewing window 62. The virtual structure may be located at an augmented reality content position (a fixed point within the reference frame). In FIG. 7B, augmented reality content may include a virtual structure shown in right side of virtual front viewing window 62. The virtual structure may be located at the augmented reality content position (the fixed point within the reference frame). Presentation of the augmented reality content on display 12 may change from those shown in FIG. 7A to those shown in FIG. 7B based on a user/a physical object controlled by a user moving forward and to the left within the reference frame. In FIGS. 7A-7B, the virtual structure may appear to be fixed at the augmented reality content position.

In some implementations, presentation component 110 may be configured to determine a field of view associated with a user. A field of view associated with a user may include a field of view of the user or a field of view of a physical object controlled by the user. For example, a field of view associated with a user may include a field of view of one or more image sensors carried by the user or carried by a physical object controlled by the user. A field of view associated with the user may change based on motion of the user (e.g., head/body turning, etc.) or motion of the physical object controlled by the user (e.g., a remote controlled vehicle turning, a camera mounted on a remote controlled vehicle turning, etc.).

Effectuating presentation of the augmented reality content on display 12 may be further based on the field of view associated with the user. For example, based on a field of view associated with a user including a field of view in front of the user/physical object controlled by the user (e.g., a user is looking forward, a camera mounted on a remote controlled vehicle is facing forward, etc.), augmented reality content located in front of a position associated with the user within the reference frame may be presented on display 12. For example, augmented reality content may be shown as illustrated in FIG. 6B, where virtual rain in front of the position associated with the user appears to be moving towards display area 61. The virtual rain may appear to move toward and past the position associated with the user.

Figure 8:
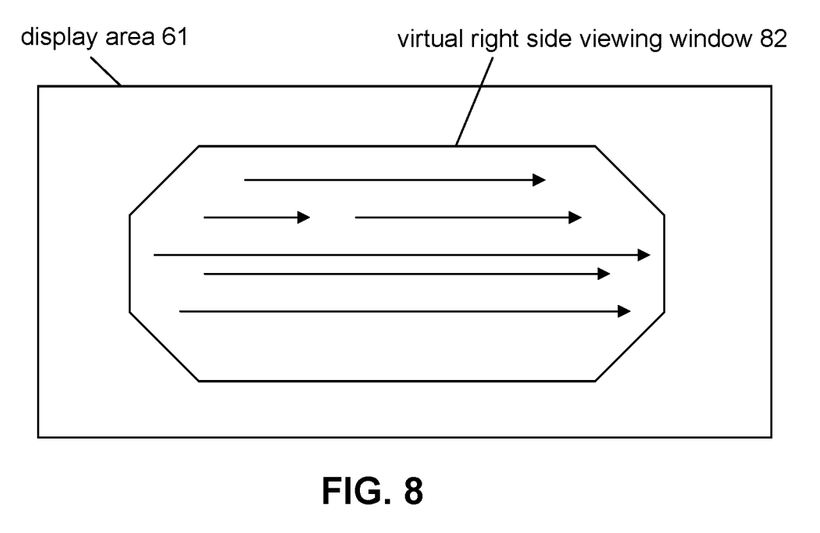
FIG. 8 illustrates an example of virtual side viewing window shown in a display area of a display.

Based on a field of view associated with a user including a field of view to the right of the user/physical object controlled by the user (e.g., a user is looking right, a camera mounted on a remote controlled vehicle is facing right, etc.), augmented reality content located to right of a position associated with the user within the reference frame may be presented on display 12. For example, augmented reality content may be shown as illustrated in FIG. 8, where virtual rain to the right of the position associated with the user appears to be moving across display area 61. The virtual rain may appear to move toward and past the position associated with the user.

In some implementations, one or more parts of other augmented reality content may be presented on display 12 based on the field of view associated with the user. For example, one or more parts of object 31 (e.g., a remote controlled vehicle, etc.) may be augmented with one or more parts of a virtual vehicle. Based on a field of view associated with a user including a field of view in front of object 31, other augmented reality content located in front of object 31 may be presented inside virtual front viewing window 62. Virtual front viewing window 62 may include one or more parts of the virtual vehicle (e.g., front part of virtual vehicle, etc.). Based on a field of view associated with a user including a field of view to the right of object 31, other augmented reality content located to the right of object 31 may be presented inside virtual right side viewing window 82. Virtual right side viewing window 82 may include one or more parts of the virtual vehicle (e.g., right side of the virtual vehicle, wing, etc.).

As another example, one or more parts of object 31 may be augmented with one or more parts of a virtual battle suit. Based on a field of view associated with a user including a field of view in front of object 31, other augmented reality content located in front of object 31 (e.g., arms of the virtual battle suit extended towards the front, etc.) may be presented on display 12. Based on a field of view associated with a user including a field of view directed behind object 31 from front of object 31, other augmented reality content behind front of object 31 (e.g., body of the virtual battle suit, legs of the virtual battle suit, etc.) may be presented on display 12.

In some implementations, system 10 may include one or more speakers. One or more computer program components (shown or not shown in FIG. 1) may be configured to effectuate operation of the speaker(s). The operation of the speaker(s) may be effectuated based on speed and/or direction of one or more augmented reality content and/or speed and/or direction of motion associated with a user. The speaker(s) may be operated to provide one or more audio effects.

An audio effect may refer to one or more information that may be observed audibly. An audio effect may be static or dynamic, and may be audibly observable at a time, over a period of time, at a location, or over a range of locations. For example, an audio effect may include one or more of a sound, a music, a word, a sentence, and/or other audio effect. For example, the speaker(s) may be operated to provide a transition sound (e.g., entering light speed sound, etc.) in response to a speed of motion associated with a user meeting and/or exceeding a threshold speed and augmented reality content component 104 determining one or more speed line effects.

In some implementations, system 10 may include one or more haptic generators. One or more computer program components (shown or not shown in FIG. 1) may be configured to effectuate operation of the haptic generator(s). The operation of the haptic generator(s) may be effectuated based on speed and/or direction of one or more augmented reality content and/or speed and/or direction of motion associated with a user. The haptic generator(s) may be operated to provide one or more haptic effects.

A haptic effect may refer to one or more information that may be observed haptically. A haptic effect may be static or dynamic, and may be haptically observable at a time, over a period of time, at a location, or over a range of locations. For example, a haptic effect may include one or more of a vibration, a motion, a temperature, and/or other haptic effects. For example, the haptic generator(s) may be operated to provide a haptic effect (e.g., vibration and temperature increase, etc.) in response to a speed of motion associated with a user meeting and/or exceeding a threshold speed and augmented reality content component 104 determining one or more speed line effects.

Although processor 11, display 12, sensor 13, and electronic storage 14 are shown to be connected to a bus 15 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

Although sensor 13 is depicted in FIG. 1 as single elements, this is not intended to be limiting. sensor 13 may include one or more sensors in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2:
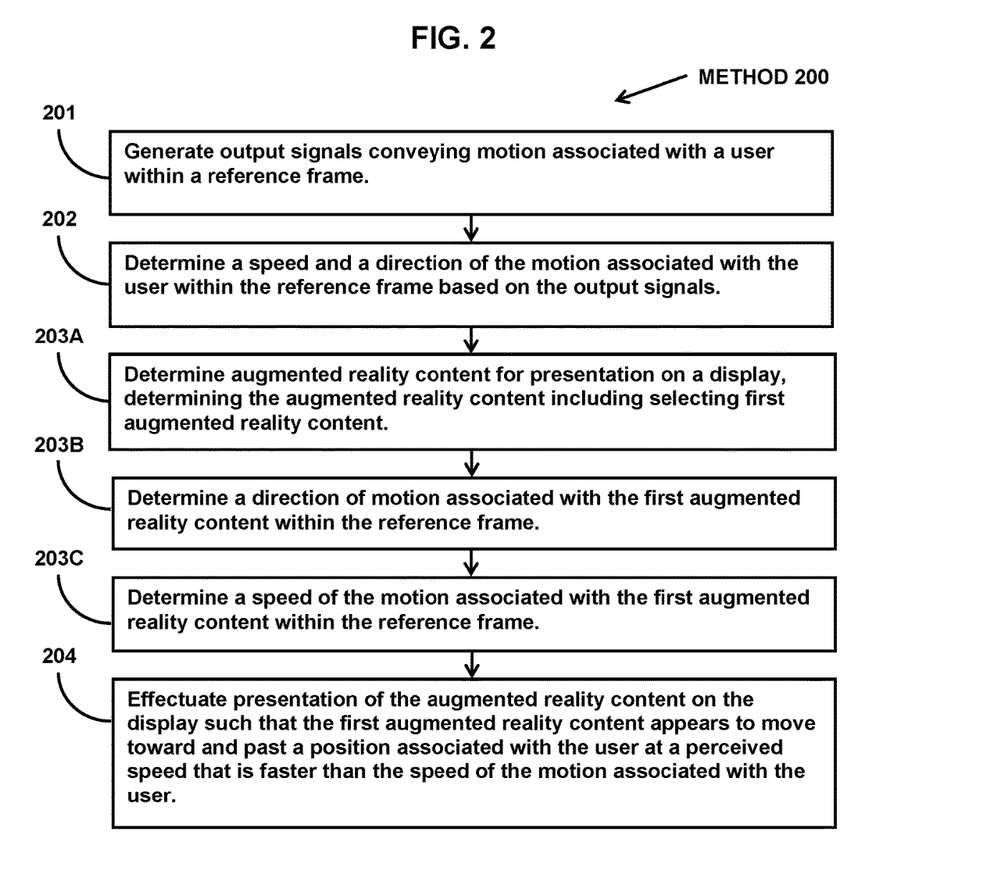
FIG. 2 illustrates a method for changing a perceived speed of motion associated with a user.

FIG. 2 illustrates method 200 for changing a perceived speed of motion associated with a user. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, output signals may be generated. Output signals may convey motion associated with a user within a reference frame. In some implementations, operation 201 may be performed by one or more sensors the same as or similar to sensor 13 (shown in FIG. 1 and described herein).

At operation 202, a speed and a direction of the motion associated with the user within the reference frame may be determined. The speed and the direction of the motion associated with the user may be determined based on the output signals. In some implementations, operation 202 may be performed by a processor component the same as or similar to motion component 102 (shown in FIG. 1 and described herein).

At operation 203A, augmented reality content may be determined for presentation on a display. Determining augmented reality content may include selecting first augmented reality content. In some implementations, operation 203A may be performed by a processor component the same as or similar to augmented reality content component 104 (shown in FIG. 1 and described herein).

At operation 203B, a direction of motion associated with the first augmented reality content within the reference may be determined. In some implementations, operation 203B may be performed by a processor component the same as or similar to augmented reality direction component 106 (shown in FIG. 1 and described herein).

At operation 203C, a speed of the motion associated with the first augmented reality content within the reference frame may be determined. In some implementations, operation 203C may be performed by a processor component the same as or similar to augmented reality speed component 108 (shown in FIG. 1 and described herein).

At operation 204, presentation of the augmented reality content on the display may be effectuated such that the first augmented reality content appears to move toward and past a position associated with the user at a perceived speed that is faster than the speed of the motion associated with the user. In some implementations, operation 204 may be performed by a processor component the same as or similar to presentation component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to change a perceived speed of motion, the system comprising:
   a display configured to present augmented reality content, the augmented reality content presented in conjunction with real world surroundings which are visible on or through the display, the augmented reality content presented within a reference frame that is fixed with respect to the real world surroundings;
   a sensor configured to generate output signals conveying motion of a remote-controlled vehicle controlled by a user within the reference frame; and
   one or more physical processors configured by machine-readable instructions to:
      determine a speed and a direction of the motion of the remote-controlled vehicle within the reference frame based on the output signals;
      determine the augmented reality content for presentation on the display, determining the augmented reality content including:
         selecting first augmented reality content, the first augmented reality content being moveable within the reference frame;
         determining a direction of motion associated with the first augmented reality content within the reference frame, the direction of the motion associated with the first augmented reality content being determined based on the direction of the motion of the remote-controlled vehicle within the reference frame, the direction of the motion associated with the first augmented reality content opposing the direction of the motion of the remote-controlled vehicle; and
         determining a speed of the motion associated with the first augmented reality content within the reference frame, the speed of the motion associated with the first augmented reality content being determined based on the speed of the motion of the remote-controlled vehicle, the speed of the motion associated with the first augmented reality content causing the user's perception of the speed of the motion of the remote-controlled vehicle to change, the speed of the motion associated with the first augmented reality content being determined to increase as the speed of the motion of the remote-controlled vehicle within the reference frame increases such that the user's perceived speed of the motion of the remote-controlled vehicle is faster than the speed of the motion of the remote-controlled vehicle within the reference frame; and
      effectuate presentation of the augmented reality content on the display such that the first augmented reality content appears to move toward and past a position associated with the user at the perceived speed that is faster than the speed of the motion of the remote-controlled vehicle.

2. The system of claim 1, wherein a relationship between the speed of the motion of the remote-controlled vehicle and the speed of the motion associated with the first augmented reality content includes a linear relationship.

3. The system of claim 1, wherein a relationship between the speed of the motion of the remote-controlled vehicle user and the speed of the motion associated with the first augmented reality content includes a non-linear relationship.

4. The system of claim 1, wherein a relationship between the speed of the motion of the remote-controlled vehicle and the speed of the motion associated with the first augmented reality content includes a threshold speed, and determining the augmented reality content further includes determining a speed line effect in response to the speed of the motion of the remote-controlled vehicle within the reference frame meeting and/or exceeding the threshold speed.

5. The system of claim 1, wherein:
   determining the augmented reality content further includes selecting second augmented reality content, the second augmented reality content fixed within the reference frame at an augmented reality content position; and
   presentation of the augmented reality content on the display is further effectuated such that the second augmented reality content appears to be fixed at the augmented reality content position.

6. The system of claim 1, wherein the one or more physical processors are further configured by machine-readable instruction to determine a field of view associated with the user and effectuating presentation of the augmented reality content on the display is further based on the field of view associated with the user.

7. The system of claim 6, wherein the field of view associated with the user includes a field of view of an image sensor.

8. A method to change a perceived speed of motion, the method comprising:
   generating output signals conveying motion of a remote-controlled vehicle controlled by a user within a reference frame, the reference frame being fixed with respect to real world surroundings;
   determining a speed and a direction of the motion of the remote-controlled vehicle within the reference frame based on the output signals;
   determining augmented reality content for presentation on a display, determining the augmented reality content including:
      selecting first augmented reality content, the first augmented reality content being moveable within the reference frame;
      determining a direction of motion associated with the of first augmented reality content within the reference frame, the direction of the motion associated with the first augmented reality content being determined based on the direction of the motion of the remote-controlled vehicle within the reference frame, the direction of the motion associated with the first augmented reality content opposing the direction of the motion of the remote-controlled vehicle; and
      determining a speed of the motion associated with the first augmented reality content within the reference frame, the speed of the motion associated with the first augmented reality content being determined based on the speed of the motion of the remote-controlled vehicle, the speed of the motion associated with the first augmented reality content causing the user's perception of the speed of the motion of the remote-controlled vehicle to change, the speed of the motion associated with the first augmented reality content being determined to increase as the speed of the motion of the remote-controlled vehicle within the reference frame increases such that the user's perceived speed of the motion of the remote-controlled vehicle is faster than the speed of the motion of the remote-controlled vehicle within the reference frame; and effectuating presentation of the augmented reality content on the display such that the first augmented reality content appears to move toward and past a position associated with the user at the perceived speed that is faster than the speed of the motion of the remote-controlled vehicle, the augmented reality content presented in conjunction with real world surroundings which are visible on or through the display, the augmented reality content presented within the reference frame.

9. The method of claim 8, wherein a relationship between the speed of the motion of the remote-controlled vehicle and the speed of the motion associated with the first augmented reality content includes a linear relationship.

10. The method of claim 8, wherein a relationship between the speed of the motion of the remote-controlled vehicle and the speed of the motion associated with the first augmented reality content includes a non-linear relationship.

11. The method of claim 8, wherein a relationship between the speed of the motion of the remote-controlled vehicle and the speed of the motion associated with the first augmented reality content includes a threshold speed, and determining the augmented reality content further includes determining a speed line effect in response to the speed of the motion of the remote-controlled vehicle within the reference frame meeting and/or exceeding the threshold speed.

12. The method of claim 8, wherein:
determining the augmented reality content further includes selecting second augmented reality content, the second augmented reality content fixed within the reference frame at an augmented reality content position; and
presentation of the augmented reality content on the display is further effectuated such that the second augmented reality content appears to be fixed at the augmented reality content position.

13. The method of claim 8, further comprising determining a field of view associated with the user and effectuating presentation of the augmented reality content on the display further based on the field of view associated with the user.

14. The method of claim 13, wherein the field of view associated with the user includes a field of view of an image sensor.

15. A system configured to change a perceived speed of motion, the system comprising:
a display configured to present augmented reality content, the augmented reality content presented in conjunction with real world surroundings which are visible on or through the display, the augmented reality content presented within a reference frame that is fixed with respect to the real world surroundings;
a sensor configured to generate output signals conveying the motion of a remote-controlled vehicle controlled by a user within the reference frame; and
one or more physical processors configured by machine-readable instructions to:

determine a speed and a direction of the motion of the remote-controlled vehicle within the reference frame based on the output signals;
determine the augmented reality content for presentation on the display, determining the augmented reality content including:
selecting first augmented reality content, the first augmented reality content being moveable within the reference frame;
determining a direction of motion associated with the first augmented reality content within the reference frame, the direction of the motion associated with the first augmented reality content being determined based on the direction of the motion of the remote-controlled vehicle within the reference frame, the direction of the motion associated with the first augmented reality content opposing the direction of the motion of the remote-controlled vehicle;
determining a speed of the motion associated with the first augmented reality content within the reference frame, the speed of the motion associated with the first augmented reality content being determined based on the speed of the motion of the remote-controlled vehicle, the speed of the motion associated with the first augmented reality content causing the user's perception of the speed of the motion of the remote-controlled vehicle to change, the speed of the motion associated with the first augmented reality content being determined to increase as the speed of the motion of the remote-controlled vehicle within the reference frame increases such that the user's perceived speed of the motion of the remote-controlled vehicle is faster than the speed of the motion of the remote-controlled vehicle within the reference frame, wherein a relationship between the speed of the motion of the remote-controlled vehicle and the speed of the motion associated with the first augmented reality content includes a linear relationship and/or a non-linear relationship; and
selecting second augmented reality content, the second augmented reality content fixed within the reference frame at an augmented reality content position; and
effectuate presentation of the augmented reality content on the display such that the first augmented reality content appears to move toward and past a position associated with the user at the perceived speed that is faster than the speed of the motion of the remote-controlled vehicle and the second augmented reality content appears to be fixed at the augmented reality content position.

16. The system of claim 15, wherein a relationship between the speed of the motion of the remote-controlled vehicle and the speed of the motion associated with the first augmented reality content includes a threshold speed, and determining the augmented reality content further includes determining a speed line effect in response to the speed of the motion of the remote-controlled vehicle within the reference frame meeting and/or exceeding the threshold speed.

* * * * *